United States Patent [19]

Ospelt

[11] Patent Number: 4,624,216
[45] Date of Patent: Nov. 25, 1986

[54] FURNACE FOR BURNING OIL OR GAS

[75] Inventor: Gustav Ospelt, Vaduz, Liechtenstein

[73] Assignee: Hoval Interliz AG, Vaduz, Liechtenstein

[21] Appl. No.: 818,535

[22] Filed: Jan. 10, 1986

[30] Foreign Application Priority Data

Jan. 29, 1985 [DE] Fed. Rep. of Germany ... 8502235[U]

[51] Int. Cl.$^4$ .............................................. F22B 5/00
[52] U.S. Cl. .................... 122/17; 122/44 A; 122/155 A
[58] Field of Search ............... 122/17, 44 A, 155 A, 122/16, 44 R; 110/324, 326

[56] References Cited

U.S. PATENT DOCUMENTS

| | | | |
|---|---|---|---|
| 1,918,935 | 7/1933 | Sellers | 122/44 A |
| 4,471,725 | 9/1984 | Holden | 122/44 A X |

*Primary Examiner*—Edward G. Favors
*Attorney, Agent, or Firm*—Becker & Becker, Inc.

[57] ABSTRACT

A furnace for burning oil or gas. The furnace has a vertical, cylindrical water jacket, with a combustion chamber being disposed at the upper end of the furnace, and a flue gas collector being disposed at the bottom end of the furnace. At least one ancillary heating tube leads downwardly in the water jacket from the combustion chamber to the flue gas collector. At least the bottom half of the ancillary heating tubes are provided with a corrosion-resistant inner side. Cup-shaped guide elements are disposed one above the other within the heating tubes. The upper rim of each of the guide elements rests against the wall of the heating tube, and the recessed cup portion of each of the guide elements is spaced from the wall of the heating tube. This recessed cup portion has radially oriented holes for directing a plurality of flue gas streams radially against the wall of the heating tube. Below the opening of the heating tube, the flue gas collector is provided with a chamber for collecting condensate. This chamber can be emptied, and has a corrosion-resistant inner side.

6 Claims, 4 Drawing Figures

FURNACE FOR BURNING OIL OR GAS

BACKGROUND OF THE INVENTION

The present invention relates to a heating boiler or furnace for burning oil or gas.

Normally, furnaces, especially those that are provided with burners for burning fuel oil, are embodied and operated in such a way that, while utilizing the heating value (lower heating value) of the fuel to the greatest extent, the flue gases leave the furnace at a temperature of 150° C. or greater, so that a sufficient draft is produced in the chimney, and no flue tar or other residue results in the chimney due to condensation of the water vapor content of the flue gases. However, by utilizing the fuel value (upper heating value) of the fuel, endeavors have been made to still further increase the furnace efficiency by utilizing and lowering the temperature of the flue gases, before they leave the furnace or enter the chimney, to such an extent with so-called combustion or fuel value furnaces that the temperature falls below the dew point of the flue gas moisture, and a condensation of the water vapor portion in the flue gases, which condensation releases the heat of vaporization of the water, takes place.

It is an object of the present invention to provide a furnace that is suitable and can be utilized as a fuel value furnace for flue gas condensation operation, but that, by a simple conversion, can also be operated as a furnace for conventional operation without the formation of condensate and at normal flue gas temperatures of about 150° to 200° C. where the chimney conditions do not permit a lower temperature of the flue gases as they leave the furnace.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
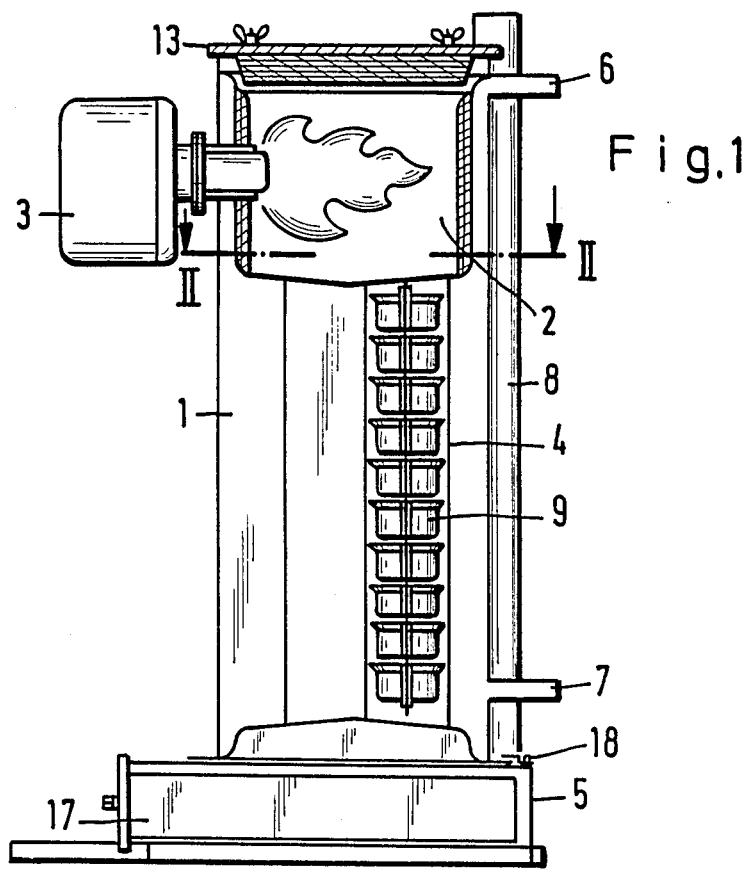
FIG. 1 is a vertical cross-sectional view of one embodiment of the inventive furnace.
Figure 2:
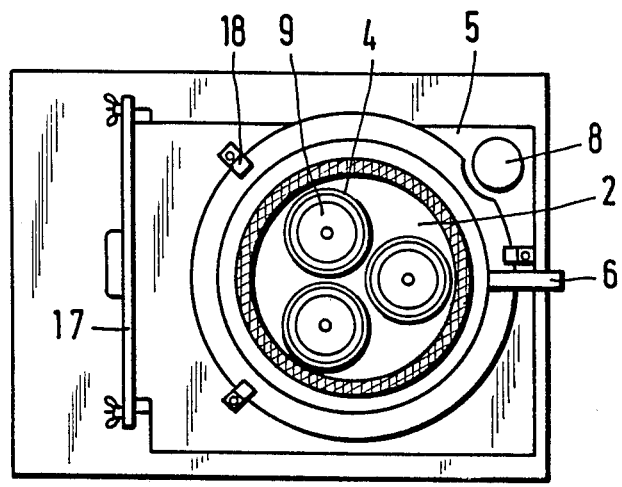
FIG. 2 is a horizontal cross-sectional view taken along the line II—II in FIG. 1.
Figure 3:
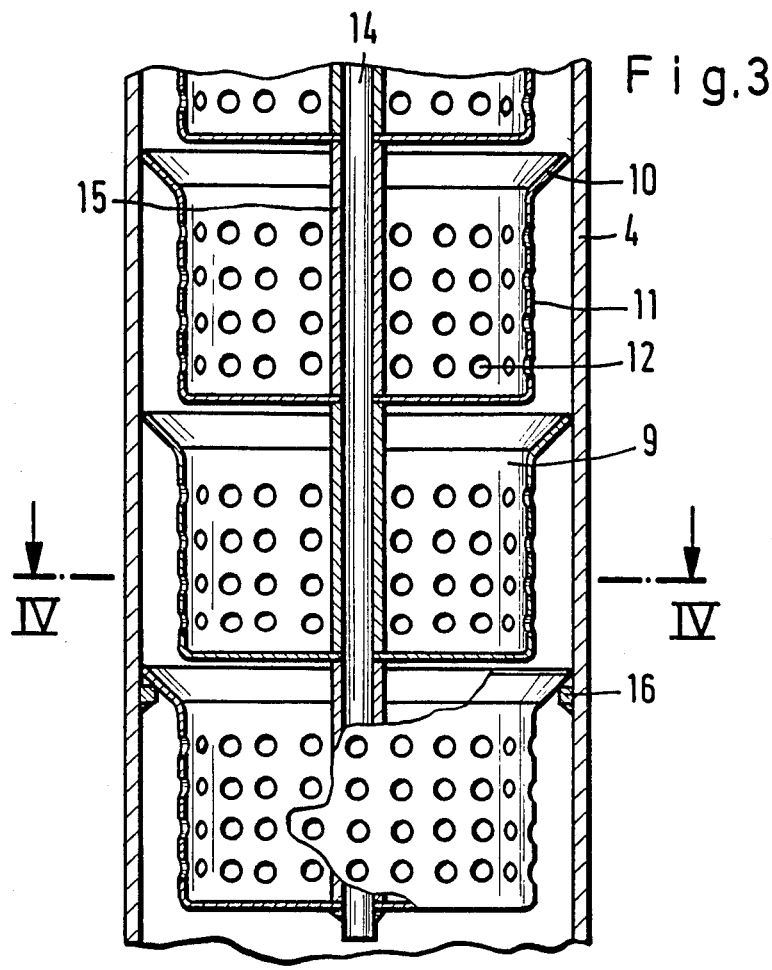
FIG. 3 is an enlarged vertical detailed cross-sectional view of a portion of the furnace of FIG. 1.
Figure 4:
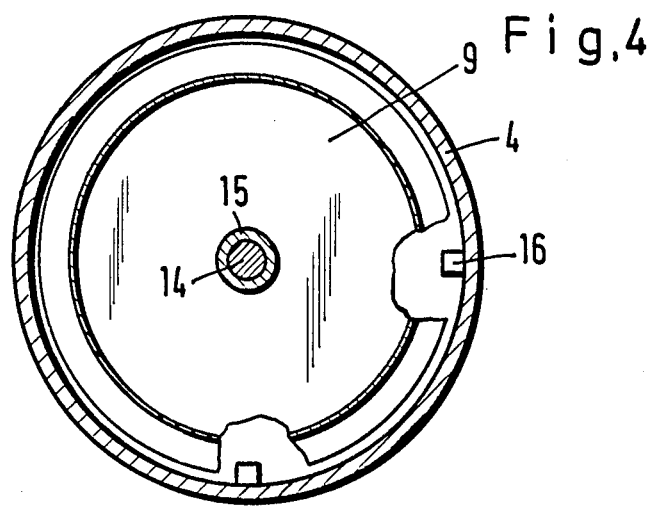
FIG. 4 is a horizontal cross-sectional view taken along the line IV—IV in FIG. 3.

The furnace of the present invention comprises: a vertically disposed, approximately cylindrical water jacket; a combustion chamber, for a burner, at the upper end of the furnace and within the water jacket; a flue gas collector disposed at the lower end of the furnace; at least one ancillary heating tube that is disposed in the water jacket and leads downwardly from the combustion chamber to the flue gas collector and provides communication between the two; below the opening of the heating tube into the flue gas collector, the latter is provided with a chamber for collecting condensate; this chamber can be emptied, and has a corrosion-resistant inner side; each heating tube has an inner wall, at least the lower half of which is corrosion-resistant; and cup-shaped guide elements that are removably disposed one above the other in the heating tubes; each guide element has an upper rim portion that butts against the inner wall of a given heating tube, and a recessed cup portion that is radially spaced from the inner wall of that heating tube; each recessed cup portion has radially oriented holes for directing a plurality of individual flue gas streams against the inner wall of the heating tube.

The number of water-cooled ancillary heating tubes that lead downwardly from the combustion chamber to the flue gas collector can be varied in conformity with the desired or required output or efficiency of the furnace. The number of cup-shaped guide elements in each individual ancillary heating tube can also be varied. By producing a number of individual, small flue gas streams, these guide elements make is possible to transfer a great amount of heat per unit of surface, and effect very high heat transfer values. As a result, it is possible to vary the flue gas temperatures at the flue gas outlet of the furnace over a very large range. By removing all of the cup-shaped guide elements, the furnace can be operated at normal flue gas temperatures of 150° C. or more, without flue condensate resulting in the furnace, if it is desired in this manner or if it is necessary to do so due to the conditions prevailing in the chimney. On the other hand, by completely equipping the ancillary heating tube with the cup-shaped guide elements over the entire length of the tube, the flue gas temperatures can be reduced to such an extent, for example to approximately 30° to 40° C., that at least in the lower half of the heating tube the temperature is below the dew point and condensation of the flue gas occurs. As a result, a considerable portion of the heat of vaporization of the water vapor contained in the flue gas is recovered in the furnace, and the efficiency of the furnace is considerably increased. In addition, the formation and retention of flue gas condensate in the flue gas and condensate collector leads to a reduction of the noxious material content of the flue gases discharged in the chimney. It is to be understood that a prerequisite for producing flue gas condensation in the furnace is that the warm water heating equipment that is connected with the furnace can be operated at a water temperature that is low enough that the return temperature of the hot water that returns to the furnace from the heating equipment is below the dew point temperature, so that a condensation operation can be undertaken in the furnace.

Advantageous further features of the inventive furnace will be described subsequently.

DESCRIPTION OF PREFERRED EMBODIMENTS

Referring now to the drawings in detail, the heating boiler or furnace includes a vertical, cylindrical water jacket 1 that at the upper end of the furnace surrounds a combustion chamber 2 for an oil or gas burner 3. In the illustrated embodiment, three ancillary heating tubes 4 lead downwardly in the water jacket 1 to a flue gas collector 5 at the bottom end of the furnace. The upper end of the water jacket 1 is provided with the feed line 6 that leads to the heating equipment, and the bottom end of the water jacket 1 is provided with the return line 7 that leads back from the heating equipment. Connected to the flue gas collector 5 is the flue gas withdrawal pipe 8 of the furnace; this pipe leads to a chimney or the like. Cup-shaped guide elements 9 are disposed in each ancillary heating tube 4. The upper rim portion 10 of each guide element 9 extends to the wall of the heating tube 4, and the recessed cup portion 11 of each guide element 9 is spaced radially from the wall of the tube and is provided with radially oriented holes 12.

The flue gases that flow downwardly in the ancillary heating tube 4 are guided into the interior of the latter by each cup-shaped guide element 9. By means of the holes 12, the flue gases are then directed radially outwardly in a number of individual flue gas streams against the wall of the heating tube. As a result, an extremely high heat transfer from the flue gases to the water-cooled tube wall is produced, and it is possible to cool the flue gases, as they travel from the combustion chamber to the flue gas collector of the furnace, to such an extent with the water that circulates through the water jacket, if the water returns to the jacket 1 from the heating apparatus via the return line 7 at a temperature of less than 40° C., that condensation of the water vapor contained in the flue gases occurs in the ancillary heating tube 4. In this way, a considerable portion of the heat of vaporization of the water vapor portion of the flue gas is recovered. At least the bottom half of each ancillary heating tube 4 has a corrosion-resistant surface, for example by using corrosion-resistant material for the heating tube itself, or by lining the inside of the heating tube with a non-porous, corrosion-resistant material, such as multi-layered, heat-resistant enamel. The cup-shaped guide elements 9 are disposed in the ancillary heating tubes 4 in such a way that they can be withdrawn from the top. The guide elements 9 can be withdrawn from the furnace through the combustion chamber 2, which is closed off at the top of the furnace by a cover 13. The guide elements 9 are placed upon a central retaining rod 14, and are thereby interconnected. The retaining rod 14 is detachably or fixedly secured to the bottom of the lowermost guide element 9. Vertical support for the guide elements 9 on the retaining rod 14 is effected by alternately placing the guide elements and spacer tubes 15 on the retaining rod. The lowermost guide element 9 in a given heating tube 4 can be supported in the latter by means of supports 16 that are provided on the inner wall of the heating tube 4 and engage, for example, the upper rim portion 10 of that guide element 9.

If the upper rim portions 10 of the cup-shaped guide elements 9 rest against the wall of the ancillary heating tube 4 to the greatest extent possible, the water condensation that runs down the wall can pass into the interior of the guide elements, especially those guide elements that are disposed near the top. These guide elements are hotter than the interior of the tube, and the water is again vaporized. In this way, especially where the furnace is fired with fuel oil, the advantageous effect is achieved that a considerable portion of the sulfur bound in the flue gas or in the condensed water is already removed in the cup-shaped guide elements as sulfur-containing residue that accumulates as crust on the cup bottoms of the guide elements. The crust can be easily removed from the individual guide elements during periodic cleaning operations, since the column of guide elements disposed on the retaining rod 14 can be easily taken apart for cleaning purposes once they have been withdrawn from the heating tube. Since it is so easy to remove the guide elements 9 from the heating tube 4 and from the furnace, the latter can also be easily converted to a customary furnace operation where flue gas condensation does not take place, for example where the chimney conditions are such that when the flue gases enter the chimney, the lowest temperature may not be less than the normal flue gas temperatures of about 150° to 200° C.

Below the bottom opening of the ancillary heating tube 4, the flue gas collector 5 is provided with a chamber 17 for collecting condensate. This chamber 17 can be emptied, and has a corrosion-resistant inner surface. The water condensate that runs down in the heating tubes drips into the chamber 17. The vertically extending flue gas withdrawal pipe 8 is connected to the upper side of the flue gas collector 5. The chamber 17 for collecting condensate extends in the flue gas collector 5 to below the opening of the flue gas withdrawal pipe 8, so that any condensate that might still be produced in the withdrawal pipe 8 can drip back into the chamber 17. The flue gas collector 5 comprises a separately produced box that is sealingly and removable connected to the bottom end of the furnace via screw fastenings 18 that can be loosened. As a result of this two-part construction of the furnace body and of the flue gas collector, it is easily possible to provide and produce the flue gas collector, or at least its walls, with an acid-resistant surface coating so that the collector is resistant to corrosion. In order to also be able to simply and completely remove sediments deposited in the condensate collecting chamber 17, the latter is embodied as a collector drawer the can be removed from the flue gas collector 5. Condensed water could be drained, for example, into a neutralizing device located externally of the furnace without pulling out or opening the collector drawer, e.g. by providing a condensate drain in the collector drawer.

The present invention is, of course, in no way restricted to the specific disclosure of the specification and drawings, but also encompasses any modifications within the scope of the appended claims.

What I claim is:

1. A furnace for burning oil or gas; said furnace has an upper and lower end, and comprises:
   a vertically disposed, approximately cylindrical water jacket;
   a combustion chamber, for a burner, at the upper end of said furnace and within said water jacket;
   a flue gas collector disposed at the lower end of said furnace;
   at least one ancillary heating tube disposed in said water jacket and leading downwardly from said combustion chamber to said flue gas collector to provide communication from the former to the latter; below the openings of said heating tubes into said flue gas collector, the latter is provided with a chamber for collecting condensate; said last-mentioned chamber can be emptied, and has a corrosion-resistant inner side; each of said heating tubes has an inner wall, at least the lower half of which is corrosion-resistant; and
   cup-shaped guide elements that are removably disposed one above the other in said heating tubes; each guide element has an upper rim portion that butts against said inner wall of a given one of said heating tubes, and also has a recessed cup portion that is radially spaced from said inner wall of that heating tube; each of said recessed cup portions has radially oriented holes for directing a plurality of individual flue gas streams against said inner wall of the associated heating tube.

2. A furnace according to claim 1, in which said guide elements can be inserted and withdrawn from the top of said heating tubes into said combustion chamber, and can be withdrawn from said furnace from said combustion chamber.

3. A furnace according to claim 2, which includes a retaining rod for interconnecting the cup-shaped guide elements of a given one of said heating tubes; and in which each of said heating tubes is provided with support means for supporting the lowermost guide element in that heating tube.

4. A furnace according to claim 1, in which said chamber for collecting condensate comprises a collector drawer that can be withdrawn from said flue gas collector.

5. A furnace according to claim 1, in which said flue gas collector comprises a box that is detachably and sealingly connected to said water jacket at the lower end of said furnace.

6. A furnace according to claim 1, which includes a vertically extending flue gas withdrawal pipe that is connected to an upper side of said flue gas collector and opens into same for receiving flue gas therefrom; and in which said chamber for collecting condensate extends below the opening of said flue gas withdrawal pipe into said flue gas collector.

* * * * *